Patented June 25, 1946

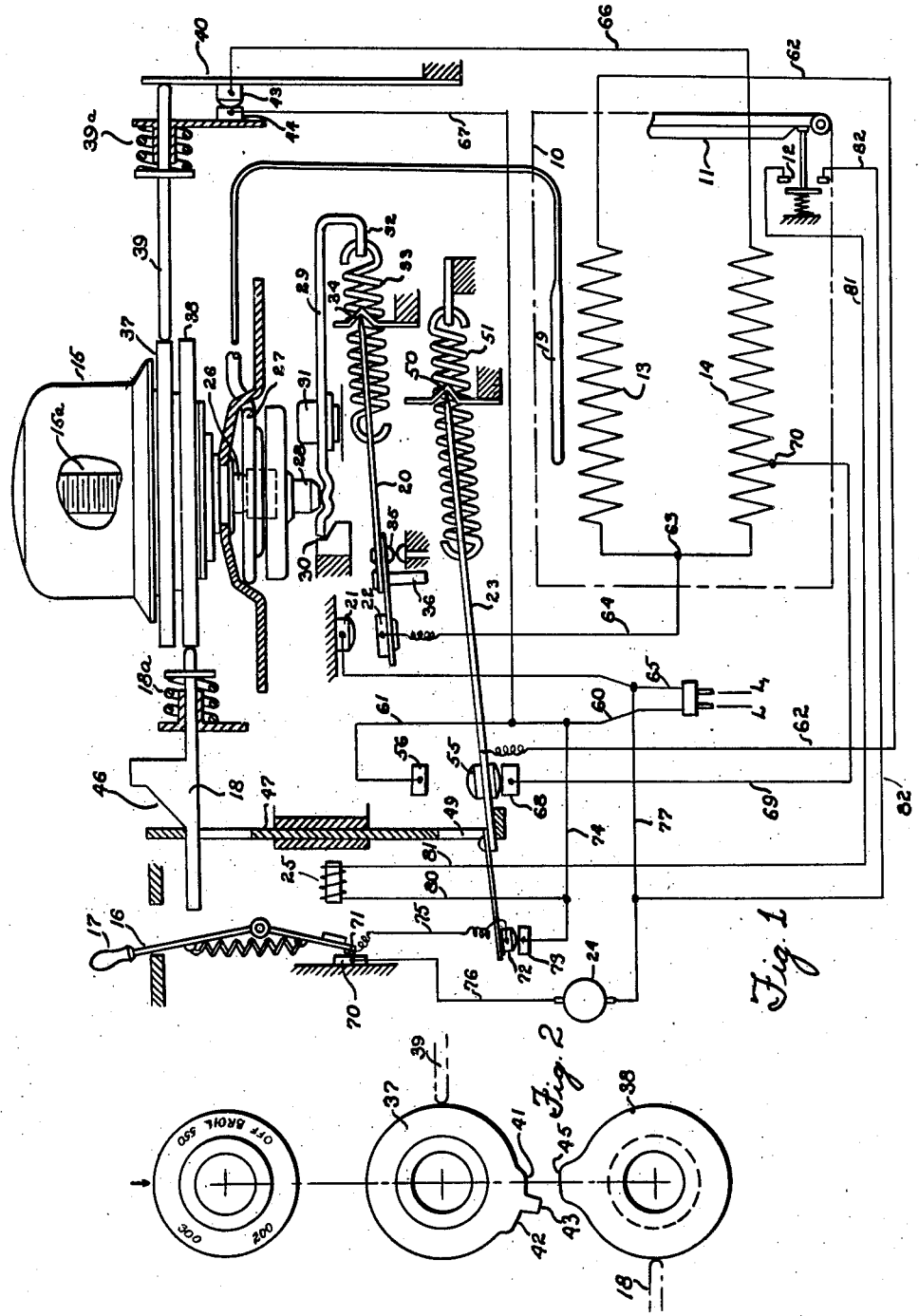

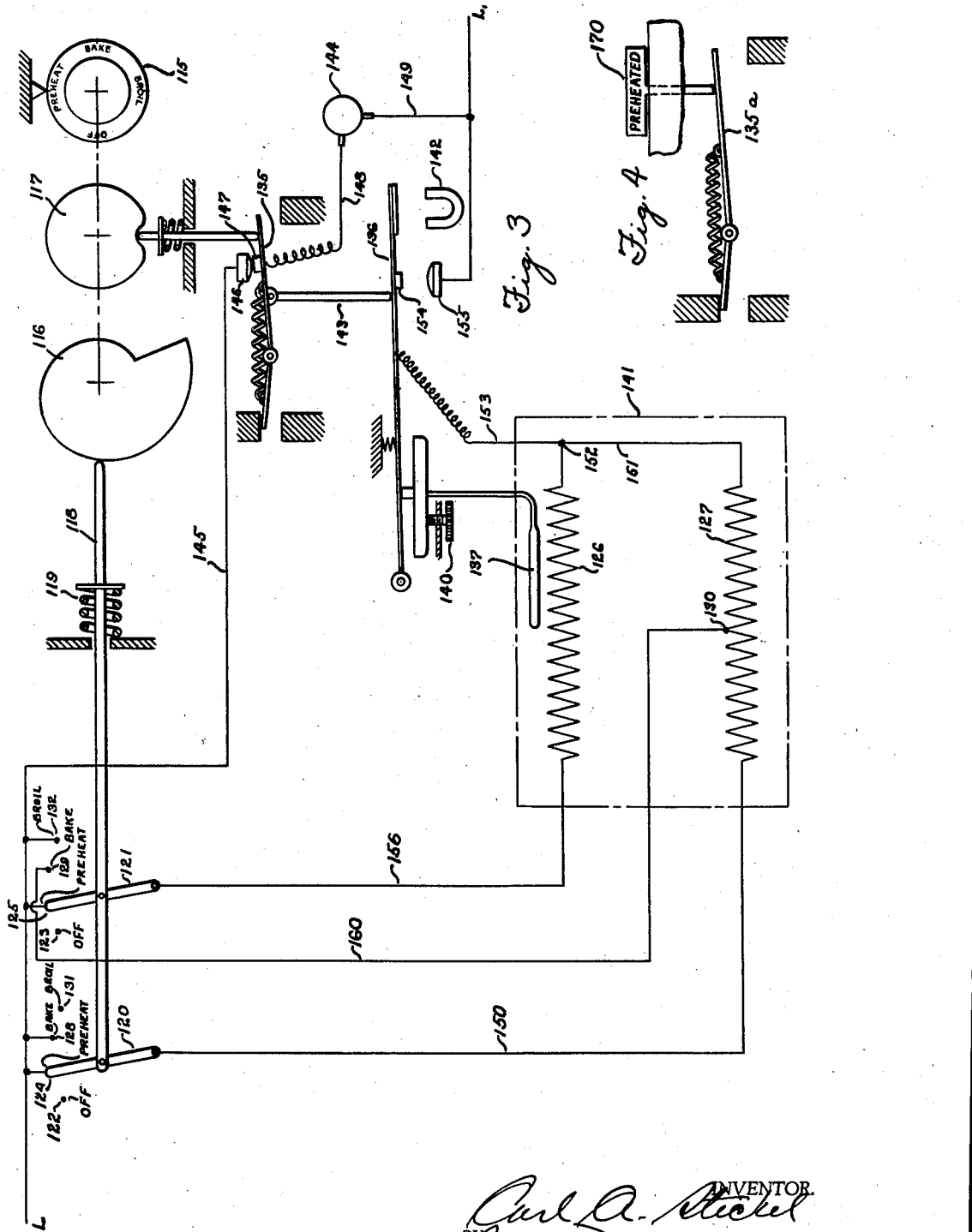

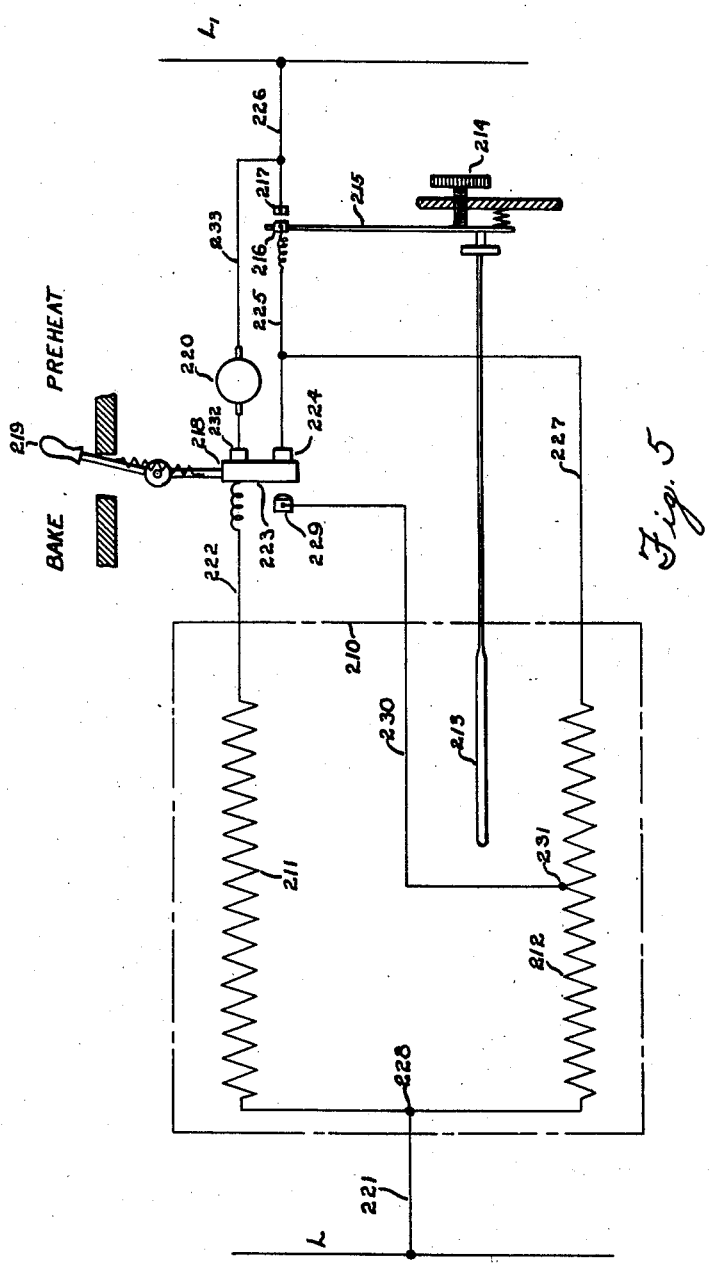

2,402,787

UNITED STATES PATENT OFFICE 2,402,787

DOMESTIC APPLIANCE

Carl A. Stickel, Dayton, Ohio, assignor to General Motors Corporation, Dayton, Ohio, a corporation of Delaware Application November 20, 1940, Serial No. 366,449

14 Claims. (Cl. 219—20)

This invention relates to domestic appliances and more particularly to electric ranges.

An object of this invention is to provide oven heating means with controls for causing rapid preheating of the oven together with a signalling device responsive to preheating conditions.

Further objects and advantages of the present invention will be apparent from the following description, reference being had to the accompanying drawings, wherein a preferred form of the present invention is clearly shown.

In the drawings:

Fig. 1 is a view, somewhat diagrammatic, of the oven heating circuit and its controls;

Fig. 2 is a diagrammatic showing of the various positions of the cams on the controlling device;

Fig. 3 is a diagrammatic representation of a slightly modified form of my invention;

Fig. 4 shows a modified form of signalling device; and

Fig. 5 shows a further modification of the invention.

The invention has provisions for energizing the heating means of an electric oven to provide for rapid preheating of the oven, and for thereafter energizing the heating means in a manner suitable for baking purposes. There are also provisions for signalling the user when the oven has been properly preheated, so that food may be placed in the oven and the current may be changed for baking conditions.

For example, in Fig. 1 the walls of the oven are indicated by the numeral 10. The oven is provided with a door 11 which closes a switch 12 when the door is opened and opens the switch when the door is closed. The oven is provided with an upper heating element 13, used for broiling purposes and for preheating purposes when energized at maximum wattage output, and is used in combination with the lower heating element 14 at reduced wattage for baking purposes. The lower heater 14 is used at maximum wattage output for preheating and baking purposes, and is unenergized during broiling operations. A rotatable knob 15 is provided for the structure controlling the circuits. Proper manipulation of this knob causes the various switches to deenergize the heating elements 13 and 14 in the "off" position, to energize the heating unit 13 at maximum wattage in the "broil" position, and to energize the lower heating unit 14 at maximum wattage with the upper unit 13 at reduced wattage at the various "bake" positions, the knob providing temperature adjustment for the "bake" positions. In addition, a switch lever 16 is provided for setting the signalling device either directly by hand at the handle 17, or by means of the knob 15 through the medium of rod 18. The arrangement is such that the knob 15 may be turned to "broil" and then to a "bake" position, which sets the circuits to operate the heaters at maximum wattage for preheating the oven. The preheating operation will continue until the temperature is reached to which the knob 15 is last set. At this time the thermostat 19 stops the preheating operation and operates the signal. The thermostat 19 accomplishes this by moving the lever 20 downwardly to open the contacts 21 and 22, deenergizing the heaters 13 and 14 and preventing overheating of the oven. At the same time the lever 23 is moved downwardly, thus placing the heaters 13 and 14 in the "bake" circuit, and at the same time causing the light, buzzer or signalling device 24 to operate and inform the user that the preheating operation has been completed and the oven is in readiness to receive the food to be baked. Opening of the door 11 stops operation of the signalling device 24 by energizing a solenoid 25 and moving the snap switch 16 to the right thus breaking the circuit to the signalling device.

Details of the parts operated by the knob 15 are as follows:

The interior construction of the knob is the same as that shown in the application of James W. Jacobs, Serial No. 366,444, for Domestic appliances filed concurrently herewith.

Turning knob 15 causes a threaded member 15a to move the point 26 up or down against the bellows 27 which is connected to the thermostat 19. Expansion and contraction of the bellows moves the point 28 towards or away from the lever 29. The lever 29 is fulcrumed at 30 and is urged upwardly by the spring structure 31. The end 32 of the lever 29 carries one end of the snap spring 33, the other end of which is attached to the lever 20. The lever 20 is fulcrumed at 34, carries stop 35, contact 22 and the pin 36. When the oven is below selected temperature, the contacts 21 and 22 are closed, and when the oven reaches the selected temperature, the contacts 21 and 22 are opened and the lever 20 moves downwardly to the limit established by the stop 35. If the lever 23 had previously been set in its upper position, the pin 36 knocks it to the lower position shown in Fig. 1. This changes the heater circuits from "preheat" to "bake," and energizes the circuit of signal 24 (if the switch 16 is in the left hand position).

The knob 15 also carries cams 37 and 38 operating rods 39 and 18 respectively. The rod 39 moves the contact lever 40, while the rod 18 moves the switch 16 outwardly and moves the lever 23 upwardly. Springs 18a and 39a are provided for maintaining rods 18 and 39 against their respective cams. The cam 37 is provided with ridges 41 and 42 on each side of the stop extension 43, so that when the rod 39 rides on the ridges 41 and 42 the lever 40 is moved outwardly to open the contacts 43 and 44. This occurs when the knob 15 is in the "broil" and "off" positions. In the "bake" position of the knob 15 (corresponding to the space between "200" and "550"), the contacts 43 and 44 are closed. The cam 38 is provided with a ridge 45 which moves the rod 18 outwardly in the "broil" position, thus, in turn, moving the switch 16 to the left and raising the lever 23 upwardly by means of the cam 46 acting on the rod 47 which in turn is provided with a slot 49 through which the lever 23 passes. The lever 23 is fulcrumed at 50 and is provided with a snap spring 51. In view of this, the knob 15 may be turned to "broil," and if the knob is left in this position, the heater 13 is energized at full wattage, but if the knob is thereafter turned to any one of the "bake" positions, such as those between 200 and 550, then the lever 23 remains in its upper position during the preheating cycle until such time as the thermostat 19 moves downwardly to terminate the preheating energization of the heaters and to initiate the baking energization of the heaters by connecting the lever 23 to its lower position. The buzzer 24 is energized at this time because the previous movement of the rod 18 outwardly during the "broil" position caused switch 16 to be moved to the left, where it remained after the knob 15 was turned to the "bake" position. The buzzer 24 continues to warn the user that the oven has been preheated until such time as the handle 17 is moved to the right.

In the "off" position the knob 15 moves the point 26 so far down, that the lever 20 is in its lower position at all temperatures, even with the bellows 27 fully collapsed. This opens the contacts 21 and 22 and prevents energization of the heaters 13 and 14. At this time the contacts 43 and 44 are also opened by ridge 42 so that the heaters are disconnected from the other side of the line.

In the "broil" position, the rods 18 and 39 are in their outermost position. This opens the contacts 43 and 44 and raises the lever 23 so that contacts 55 and 56 are closed. Turning of the knob 15 to "broil" raises the point 26 to an adjustment corresponding to about 600°, causing the contacts 21 and 22 to close. With this setting, the circuit may be traced from line L through 60, 61, 56, 55, 62, 13, 63, 64, 22, 21, 65 to L₁. This energizes the upper heater 13 at full wattage; but because the contacts 43 and 44 are opened, the lower heater 14 is deenergized. Food placed under the heater 13 is broiled under these conditions.

When the knob 15 is turned to any one of the "bake" positions, such as between 200 and 550, without first turning it to "broil," the heater 14 is energized at full wattage and heater 13 at reduced wattage. This is accomplished because the lever 23 is in its lower position, the contacts 43 and 44 are closed and the contacts 21 and 22 are closed by reason of the setting of the point 26. A circuit may then be traced from L₁ through 65, 21, 22, 64 and point 63 here the circuit splits, one branch going through heater 14, 66, 43, 44, 67, 60 and L to energize the lower heater 14 at maximum wattage. The other branch from the point 63 goes through the heater 13, 62, 55, 68, 69 to a tap 70 joining the heater 14 at a point where the voltage is less than that of L, thus imposing a reduced voltage on the heater 13. Under these conditions, the heaters are cycled by the cycling of contacts 21 and 22 to maintain the oven at the selected baking temperature.

If the knob 15 is turned to "broil" and then to "bake", a quick preheating circuit is set up which continues until the first cycle of the thermostat at which time the circuit is changed from "preheat" to "bake" and at which time the signal or buzzer 24 is energized to notify the user that the oven has been preheated. This is accomplished because moving the knob 15 to "broil" raises the lever 23 upwardly by the action of cam 46 on rod 47. Thereafter the movement of the knob 15 to "bake" closes contacts 43 and 44 and leaves the lever 23 in the upper position. This establishes the preheating cycle which may be traced from L₁ through 65, 21, 22, 64 and 63. Here a circuit branches, one branch going through heater 13, 62, 55, 56, 61, 60 to L. The other branch from 63 goes through the heater 14, 66, 43, 44, 67, 60 and L. This energizes both heaters 13 and 14 at full wattage. When the oven preheats to the selected temperature for baking, the thermostat 19 opens contacts 21 and 22, at the same time causes pin 36 to move the lever 23 to its lower position. This establishes a "bake" circuit exactly the same as that previously described. In addition, the buzzer 24 is energized because the switch 16 was moved to the left when the knob was turned to "broil" and this closed the contacts 70 and 71. The contacts 72 and 73 were closed when the lever 23 was knocked down on the first cycle of the thermostat. This establishes a circuit through the buzzer beginning at L through 60, 74, 73, 72, 75, 71, 70, 76, 24, 77, 65 and L₁. When the user is notified by the signal, the user opens the door 11 to insert food and this stops operation of the buzzer 24 by closing switch 12, energizing solenoid 25 and moving switch 16 to the right. This deenergizes the signal 24 by opening contacts 70 and 71. The circuit energizing the solenoid may be traced from L through 60, 74, 80, 25, 81, 12, 82, 77, 65 and L₁.

Fig. 3 shows a modified arrangement. The knob 115 is provided with cams 116 and 117. The cam 116 moves the rod 118 against the action of spring 119. The rod 118 moves contacts 120 and 121. When the knob 115 is in "off" position, the contacts 120 and 121 are on contacts 122 and 123 respectively, these contacts being dead and not connected to any load. The heaters are therefore not energized. When the knob 115 is moved to "preheat," the contacts 120 and 121 are on contacts 124 and 125. This energizes the upper heater 126 and the lower heater 127 at full wattage across the lines L and L₁. When the knob 115 is on "bake" the contacts 120 and 121 are on contacts 128 and 129. This energizes the lower heater 127 at full wattage across the lines L, L₁ and the upper heater 126 between L₁ and the tapped point 130 to energize the heater 126 at reduced wattage. When the knob 115 is in the "broil" position the contacts 120 and 121 are on contacts 131 and 132. This energizes heater 126 at full wattage across the line L, L₁ without energizing heater 127.

The cam 117 maintains the buzzer switch 135 in its lower or open position in every position of the knob 115 except the "preheat" position. When the knob 115 is moved from any other position to the "preheat" position, the cam 117 is placed in a position shown in Fig. 3; but the switch 135 remains in its lower position, although it may be moved to its upper position by an upward cycling of the thermostat arm 136 under the impulse of thermostatic bulb 137. The arrangement is such that the knob 115 may be moved to "preheat," and a thermostatic adjustment knob 140 may be placed at any desired temperature to cause the thermostat 137 to cycle at the desired temperature. When this temperature is reached in the oven 141, arm 136 moves upwardly by a snap action away from the magnet 142 and knocks the switch 135 to its upper position through the medium of rod 143. This energizes the buzzer 144 to notify the user that the oven has been preheated. A circuit may be traced from L through 145, contacts 146, and 147, 148, 144, 149 and L₁. The user, hearing the buzzer 144 may turn the knob 115 to the "bake" position, and this causes cam 113 to open switch 145 to stop energization of the buzzer 144. At the same time the cam 113 moves the contacts 120 and 121 over the contacts 128 and 129 to energize the heaters 126 and 127 in the "bake" circuit.

The "preheat" circuit may be traced from L through contact 124, 120, 150, 127, 151, 152, 153, 154, 155, L₁. Also from L through 125, 121, 156, 126, 152, 153, 154, 155, L₁. This energizes the heaters 126 and 127 at full wattage in parallel across the lines L and L₁.

The "bake" circuit may be traced from L through 128, 120, 150, 127, 151, 152, 153, 154, 155 and L₁ to energize the lower heater at full wattage. The upper heater circuit conveniently may be traced from L₁ backward to the point 152 through heater 126, 156, 121, 129 and 160 to the point 130 where the voltage is less than that of L to produce a reduced wattage in heater 126. The broil circuit may be traced from L through 132, 121, 156, 126, 152, 153, 154, 155, L₁.

Fig. 4 shows a different type of signalling device, which may be used with any of the circuits herein disclosed. For example, it may be used with the circuit shown in Fig. 3 and is intended to replace the buzzer 144, wires 145, 148 and 149 and the contacts 146 and 147. When the oven has reached its selected temperature by heat from the preheating circuit, the snap mechanism 135a, which corresponds to snap switch 135, moves the signal 170 so that it may be seen by the user. The signal may carry a legend such as "preheated" to inform the user that the oven has been preheated.

Fig. 5 shows a slightly modified circuit.

The oven 210 may be provided with an upper heater 211 and a lower heater 212. A thermostat 213 may be adjusted by the knob 214 to be responsive to any selected temperature. The thermostat 213 operates a snap lever 215 carrying contact 216 which closes on contact 217 when the oven 210 is below the selected temperature and opens when the oven reaches the selected temperature. A snap switch 218 is provided with a handle 219, the arrangement being such that when the handle 219 is moved to the left or "bake" position, the lower heater is energized at full wattage with the upper heater at reduced wattage. When the handle 219 is moved to the right or "preheat" position, the heaters 211 and 212 are heated at full wattage. When the handle 219 is moved to "preheat" position, the buzzer, light or other signalling device 220 is energized only when the thermostat contacts 216 and 217 are opened to warn the user that the oven has been preheated.

After the oven has reached its selected temperature after being heated under "preheat" conditions, the user may move the handle 219 to the left or "bake" position and place food in the oven for baking purposes. The food is then baked with the lower heater at full wattage and the upper heater at reduced wattage.

The "preheat" circuit may be traced from line L through 221, 228, 211, 222, 223, 224, 225, 216, 217, 226, L₁. Also the "preheat" circuit includes the lower heater, being energized from L through 221, 228, 212, 227, 225, 216, 217, 226, L₁.

The "bake" circuit energizes the lower heater at full wattage and the upper heater at reduced wattage. The circuit may be traced as follows: L, 221, where it branches at 228, one branch going through lower heater 212, 227, 225, 216, 217, 226, L₁. The other branch from 228 passes through the upper heater 211, 222, 223, 229, 230 to the tap 231 in the lower heater which produces a reduced voltage and wattage in the upper heater 211.

The signal 220 is energized at the end of the "preheat" cycle because the contacts 216 and 217 are opened, establishing a circuit through the buzzer from L through 221, 228, 211, 222, 218, 232, 220, 233, 226 and L₁. Since the resistance of buzzer 220 is very great compared to that of heater 211, practically no heating takes place in the heater under these conditions, and it acts merely as a conductor for the small buzzer current.

While the form of embodiment of the invention as herein disclosed, constitutes a preferred form, it is to be understood that other forms might be adopted, all coming within the scope of the claims which follow.

What is claimed is as follows:

1. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, a signalling device, means responsive to the setting of said selector switch means in preheat position and the modifying of the connection of said power source with said heating means by said thermostatic means for rendering said signalling device effective and thereafter to remain effective independently of said thermostatic means, and means independent of said thermostat to render said signalling device ineffective after being rendered effective by said thermostat, said last named means being automatically reset when said selector switch means is reset to preheat position.

2. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, a signalling device, means responsive to the setting of said selector switch means in preheat position and the modification of the connection of said power source with said heating means by said thermostatic means for rendering said signalling device effective and thereafter to remain effective independently of said thermostatic means until said selector switch means is set in cooking position, and means responsive to the setting of said selector means to the cooking position for rendering the signalling device ineffective.

3. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, a signalling device, an oven door, means responsive to the setting of said selector switch means in preheat position and the modification of the connection of said power source with said heating means by said thermostatic means for rendering said signalling device effective and thereafter to remain effective independently of said thermostatic means, and means responsive to the movement of said door for rendering said signalling device ineffective.

4. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, means operated by said thermostatic means when modifying the connection of said source of power with said heating means for changing the setting of said selector switch means from preheat position to cooking position, a signalling device, means responsive to the setting of said selector switch means in preheat position and the modification of the connection of said power source with said heating means by said thermostatic means for rendering said signalling device effective and thereafter to remain effective independently of said thermostatic means, and manual means for rendering said signalling device ineffective, said last named means being automatically reset when said selector switch means is reset to preheat position.

5. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, means operated by said thermostatic means when modifying the connection of said source of power with said heating means for changing the setting of said selector switch means from preheat position to cooking position, a signalling device, an oven door, means responsive to the setting of said selector switch means in preheat position and the modification of the connection of said power source with said heating means by said thermostatic means for rendering said signalling device effective and thereafter to remain effective independently of said thermostatic means, and means responsive to the movement of said door for rendering said signalling device ineffective.

6. In combination, an oven, electric heating means for said oven, a source of electrical power, selector switch means settable in preheat and cooking positions respectively connecting said source of electrical power to energize said electric heating means in a preheat circuit with relatively high wattage and in a cooking circuit with a relatively reduced wattage, thermostatic means responsive to oven temperatures modifying the connection of said source of power with said heating means when said temperatures are below and above selected values respectively, an audible signalling device, means responsive to the setting of said selector switch means in preheat position and the modification of the connection of said power source with said heating means by said thermostatic means for rendering said signalling device audible and thereafter to remain audible independently of said thermostatic means, and manual means for rendering said signalling device inaudible, said last named means being automatically reset when said selector switch means is reset to preheat position.

7. In combination, an oven, an oven door, electric heating means in said oven, thermostatic means responsive to temperatures in said oven for energizing and deenergizing said electric heating means, an audible signal, manual signal setting means, means controlled by said thermostatic means for automatically rendering said signal audible after said manual setting means have been actuated and when said thermostatic means deenergizes said heating means, means thereafter maintaining said signal audible and independent of control by said thermostatic means, and means controlled by the opening of said oven door for rendering said signal inaudible.

8. In combination, an oven, electric heating means for said oven, thermostatic switch means responsive to oven temperatures for energizing and deenergizing the heating means to regulate oven temperatures by a series of energizing cycles including a first preheat cycle followed by a baking cycle, said oven being provided with a door, a signalling device having a normal non-signalling condition and a signalling condition, means controlled by said oven door for resetting said signalling device to its normal non-signalling condition, and means including an energizing circuit controlled by said thermostatic switch means for placing said signalling device in its signalling condition at the completion of the first energizing preheat cycle of the heating means to remain thereafter in signalling condition independently of said thermostatic switch means, movement of said door changing said signalling device to its non-signalling condition, and means to maintain said signalling device in non-signalling condition until after another preheat cycle is initiated.

9. In combination, an oven, electric heating means for said oven, thermostatic switch means responsive to oven temperatures for energizing and deenergizing the heating means to regulate oven temperatures by a series of energizing cycles including a first preheat cycle followed by a baking cycle, an electrical signalling device, a circuit portion connected to said signalling device for energizing said signalling device, said circuit portion being provided with a manually settable switch means therein for opening and closing said circuit portion, and means controlled by said thermostatic switch means for preventing the energization of said signalling device during the initial preheat energizing cycle of said heating means and energizing said signalling device after said cycle, said manually settable switch means being thereafter movable to deenergize said signalling device independently of said thermostatic switch means, said manually settable switch means being resettable and said means controlled by said thermostatic switch being again effective when said oven temperatures are below the temperature range of said baking cycle.

10. In combination, an oven, electric heating means for said oven, thermostatic switch means having closed and opened positions responsive to oven temperatures for energizing and deenergizing the heating means to regulate oven temperatures, an electrical signalling device, a circuit portion connected to said signalling device for energizing said signalling device, said circuit portion being provided with a manually settable switch means therein for opening and closing said circuit portion, said manually settable switch means when closed placing said circuit portion in shunt circuit arrangement with respect to the closed position of said thermostatic switch means and in by-passing arrangement with respect to the open position of said thermostatic switch means for substantially deenergizing the signalling device during the closed periods of the thermostatic switch means and for energizing said signalling device during the open periods of said thermostatic switch means when said manually settable switch means is closed.

11. In combination, an oven, electric heating means for said oven, thermostatic switch means responsive to oven temperatures for energizing and deenergizing the heating means to regulate oven temperatures by a series of energizing cycles including a first preheat cycle followed by a baking cycle, an electrical signalling device, a circuit portion connected to said signalling device for energizing said signalling device, said circuit portion being provided with a manually settable switch means therein for opening and closing said circuit portion, said thermostatic switch means being provided with contact means in said circuit portion, means for closing said contact means at the end of the first preheat energizing cycle of the heating means to remain closed thereafter independently of said thermostatic means, and resetting means for reopening said contact means.

12. In combination, an oven, an oven door, electric heating means for said oven, thermostatic means responsive to temperatures in said oven for energizing and deenergizing said electric heating means, a noticeable signal, manual signal setting means, means controlled by said thermostatic means for automatically rendering said signal noticeable after said manual setting means have been actuated and when said thermostatic means deenergizes said heating means, means thereafter maintaining said signal noticeable and independent of control by said thermostatic means, and means controlled by movement of said oven door for rendering said signal unnoticeable.

13. In combination, an oven, an oven door, heating means for said oven heatable under preheating and baking heating conditions, thermostatic means responsive to temperatures in said oven for turning said heating means on and off from said preheating and baking conditions, a noticeable signal, manual signal setting means, means controlled by said thermostatic means for automatically rendering said signal noticeable after said manual setting means have been actuated and when said thermostatic means turns said heating means off, means thereafter maintaining said signal noticeable and independent of control by said thermostatic means, and means controlled by movement of said oven door for rendering said signal unnoticeable.

14. In combination, an oven, an oven door, heating means for said oven heatable under preheating and baking conditions, thermostatic means responsive to temperatures in said oven for turning said heating means on and off from said preheating and baking conditions and for changing the thermostatic control from preheating to baking conditions, a noticeable manual signal and thermostatic temperature setting means, means controlled by said thermostatic means for automatically changing the thermostatic control from preheating to baking conditions and for automatically rendering said signal noticeable after said manual setting means have been actuated to a selected temperature and when said thermostatic means turns said heating means off, said selected temperature means thereafter maintaining said signal noticeable and independent of control by said thermostatic means while said thermostatic means has been changed from preheating to baking conditions, and means controlled by movement of said oven door for rendering said signal unnoticeable.

CARL A. STICKEL.